United States Patent Office 2,971,976
Patented Feb. 14, 1961

2,971,976
PHOSPHOROAMIDOTHIOATES

Harry F. Brust, Midland, Mich., assignor to The Dow Chemical Company, Midland, Mich., a corporation of Delaware No Drawing. Filed Nov. 2, 1959, Ser. No. 850,098

6 Claims. (Cl. 260—461)

The present invention is directed to phosphoroamidothioates corresponding to the formula

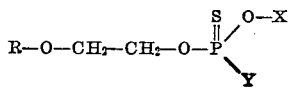

In this and succeeding formulae, R represents lower alkylphenyl, halophenyl or lower alkyl-halophenyl; X represents lower alkyl or lower alkenyl and Y represents lower alkyl amino. The expressions "lower alkyl" and "lower alkenyl" are employed in the present specification and claims to refer to radicals containing not more than 5 carbon atoms. These new compounds are liquid or crystalline solid materials which are somewhat soluble in many common organic solvents and of low solubility in water. They are useful as parasiticides and are adapted to be employed as active toxic constituents of compositions for the control of mites, insects, Helminth and bacterial organisms such as flies, beetles, southern army worms and Alternaria solani.

The new compounds may be prepared by reacting an alkali metal salt of a lower alcohol (XOH) with a phosphoroamidochloridothioate having the formula

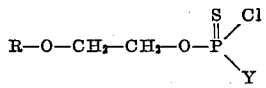

The reaction preferably is carried out in an inert organic liquid as reaction medium and conveniently in the alcohol from which the alcoholate is prepared. Good results are obtained when employing substantially equimolecular proportions of the reagents. The reaction is somewhat exothermic and takes place smoothly at temperatures of from —10° to 80° C. with the production of the desired product and alkali metal chloride of reaction. The temperature may be controlled by regulating the rate of contacting the reactants and by external cooling. In carrying out the reaction, the reactants may be mixed together in any convenient fashion and at a temperature of from —10° to 80° C. When the reaction is complete, the reaction medium may be removed by evaporation or distillation under reduced pressure and the residue dispersed in a water immiscible solvent such as benzene or methylene chloride. The solvent mixture is washed with water and the solvent thereafter removed by evaporation or distillation under reduced pressure to obtain the desired product as a residue. This product may be further purified by conventional procedures.

The following examples merely illustrate the invention and are not to be construed as limiting:

*Example 1.—O-methyl O-2-(2,4,5-trichlorophenoxy)-ethyl N-methyl phosphoroamidothioate*

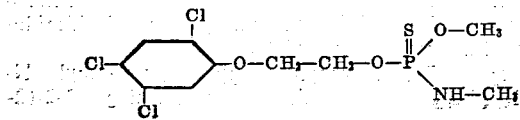

Sodium (1.8 grams; 0.078 mole) was dissolved in 50 milliliters of methanol to prepare a solution of sodium methylate. This solution was added portionwise with stirring to 28 grams (0.076 mole) of O-2-(2,4,5-trichlorophenoxy)-ethyl N-methyl phosphoroamidochloridothioate (melting at 63°–67° C.) dispersed in 80 milliliters of methanol. The addition was carried out over a period of one hour and at a temperature of from 5° to 10° C. The reaction mixture was then warmed to room temperature and stirring continued for 16 hours to complete the reaction. The mixture was thereafter filtered to separate sodium chloride and the solvent removed from the filtrate by distillation under reduced pressure. As a result of these operations, there was obtained an O-methyl O-2-(2,4,5-trichlorophenoxy)-ethyl N-methyl phosphoroamidothioate product as a crystalline solid having a melting point of 75°–76° C.

*Example 2.—O-methyl O-2-(4-sec.-butylphenoxy)-ethyl N-methyl phosphoroamidothioate*

Sodium (3.5 grams; 0.152 mole) was dissolved in 100 milliliters of methanol to prepare a solution of sodium methylate. This solution was added portionwise with stirring to 48.2 grams; (0.15 mole) of O-2-(4-sec.-butylphenoxy)-ethyl N-methyl phosphoroamidochloridothioate (n/D of 1.5452 at 25° C.) dispersed in 150 milliliters of methanol. The addition was carried out over a period of one hour and at a temperature of from 5° to 10° C. Following the addition, the reaction mixture was allowed to warm to room temperature and stirring continued for 16 hours to complete the reaction. The reaction mixture was then filtered, the reaction solvent removed by distillation under reduced pressure and the residue diluted with 250 milliliters of methylene chloride. The methylene chloride solution was then filtered and the methylene chloride removed from the filtrate by distillation under reduced pressure to obtain an O-methyl O-2-(4-sec.-butylphenoxy)-ethyl N-methyl phosphoroamidothioate product as a liquid material. This product had a refractive index n/D of 1.5274 at 25° C. and a sulfur content of 9.8 percent as compared to a theoretical content of 10.1 percent.

*Example 3.—O-methyl O-2-(3,4-dichlorophenoxy)-ethyl N-methyl phosphoroamidothioate*

Sodium (3.45 grams; 0.15 mole) was dissolved in 100 milliliters of methanol and the resulting solution added portionwise with stirring to 50.3 grams (0.15 mole) of O-2-(3,4-dichlorophenoxy)-ethyl N-methyl phosphoroamidochloridothioate (n/D of 1.5830 at 25° C.) dispersed in 150 milliliters of methanol. The addition was carried out over a period of one hour and at a temperature of from 5° to 10° C. The reaction mixture was warmed to room temperature and stirring continued for 16 hours to complete the reaction. The reaction mixture was then filtered, the reaction solvent removed from the filtrate by distillation under reduced pressure and the residue dissolved in 300 milliliters of methylene chloride. The methylene chloride solution was washed with water and the methylene chloride thereafter removed by distillation under reduced pressure at temperatures gradually increasing up to 60° C. at 0.1 millimeter pressure. As a result of these operations, there was obtained an O-methyl O-2-(3,4-dichlorophenoxy)-ethyl N-methyl phosphoroamidothioate product as a liquid material having a refractive index n/D of 1.5628 at 25° C. and a phosphorus content of 9.4 percent as compared to a theoretical content of 9.39 percent.

*Example 4.—O-methyl O-2-(2,4-dichlorophenoxy)-ethyl N-methyl phosphoroamidothioate*

Sodium (1.75 grams; 0.076 mole) was dissolved in 75 milliliters of methanol and the resulting solution added portionwise with stirring to 25 grams (0.075 mole) of O-2-(2,4-dichlorophenoxy)-ethyl N-methyl phosphoroamidochloridothioate (n/D of 1.5814 at 25° C.) dispersed in 100 milliliters of methanol. The addition was carried out over a period of one hour at 5° C. and the reaction mixture then allowed to come to room temperature and stirred for 14 hours to complete the reaction. The reaction mixture was then processed as described in Example 3 to obtain an O-methyl O-2-(2,4-dichlorophenoxy)-ethyl N-methyl phosphoroamidothioate product as a crystalline solid having a melting point of 65°–66° C. and a chlorine content of 21.45 percent as compared to a theoretical content of 21.45 percent.

*Example 5.—O-ethyl O-2-(3,4-dichlorophenoxy)-ethyl N-methyl phosphoroamidothioate*

Sodium (3.45 grams; 0.15 mole) was dissolved in 100 milliliters of ethanol and the resulting solution added portionwise with stirring to 50.3 grams (0.15 mole) of O-2-(3,4-dichlorophenoxy)-ethyl N-methyl phosphoroamidochloridothioate dispersed in 150 milliliters of ethanol. The addition was carried out over a period of two hours at from 5° to 10° C. and the temperature then allowed to rise to 25° and stirring continued for 16 hours to complete the reaction. The reaction mixture was thereafter processed as described in Example 3 to obtain an O-ethyl O-2-(3,4-dichlorophenoxy)-ethyl N-methyl phosphoroamidothioate product as a liquid material having a refractive index n/D of 1.5563 at 25° C., and phosphorus and sulfur contents of 9.1 percent and 9.38 percent, respectively, as compared to theoretical contents of 9.0 percent and 9.32 percent.

*Example 6.—O-ethyl O-2-(2,4-dichlorophenoxy)-ethyl N-methyl phosphoroamidothioate*

Sodium (1.75 grams; 0.076 mole) was dissolved in 75 milliliters of ethanol and the resulting solution added portionwise over a period of one hour with stirring to 25 grams (0.075 mole) of O-2-(2,4-dichlorophenoxy)-ethyl N-methyl phosphoroamidochloridothioate dissolved in 100 milliliters of ethanol. The addition was carried out at a temperature of from 5°–10° C. and the reaction mixture warmed to room temperature and stirred for 16 hours to complete the reaction. The reaction mixture was thereafter processed as described in Example 3 to obtain an O-ethyl O-2-(2,4-dichlorophenoxy)-ethyl N-methyl phosphoroamidothioate product as a liquid material having a refractive index n/D of 1.5545 at 25° C. and a chlorine content of 20.58 percent as compared to a theoretical content of 20.75 percent.

*Example 7.—O-methyl O-2-(2,4-dichlorophenoxy)-ethyl N-isopropyl phosphoroamidothioate*

Sodium (1.80 grams; 0.0784 mole) was dissolved in 75 milliliters of methanol and the resulting solution added portionwise over a period of one hour with stirring to 28 grams (0.0772 mole) of O-2-(2,4-dichlorophenoxy)-ethyl N-isopropyl phosphoroamidochloridothioate (melting at 52°–54° C.) dispersed in 100 milliliters of methanol. The addition was carried out at 5° C. and the reaction mixture warmed to room temperature and stirred for 16 hours. The reaction mixture was then processed in the manner of the preceding example to obtain an O-methyl O-2-(2,4-dichlorophenoxy)-ethyl N-isopropyl phosphoroamidothioate product as a crystalline solid having a melting point of 44°–45° C. and a chlorine content of 19.8 percent as compared to a theoretical content of 19.82 percent.

*Example 8.—O-methyl O-2-(3,4-dichlorophenoxy)-ethyl N-isopropyl phosphoroamidothioate*

Sodium (3.5 grams; 0.152 mole) was dissolved in 100 milliliters of methanol and the resulting mixture added portionwise with stirring to 54.2 grams (0.15 mole) of O-2-(3,4-dichlorophenoxy)-ethyl N-isopropyl phosphoroamidochloridothioate (melting at 45°–58° C.) dispersed in 200 milliliters of methanol. The conditions of reaction and methods of separation were all in the manner of the preceding example. As a result of these operations, there was obtained an O-methyl O-2-(3,4-dichlorophenoxy)-ethyl N-isopropyl phosphoroamidothioate product as a liquid material having a refractive index n/D of 1.5466 at 25° C. and a sulfur content of 8.9 percent as compared to a theoretical content of 8.95 percent.

*Example 9.—O-ethyl O-2-(2,4-dichlorophenoxy)-ethyl N-isopropyl phosphoroamidothioate*

Sodium (1.8 grams; 0.0784 mole) was dissolved in 75 milliliters of ethanol and the resulting solution added portionwise with stirring to 28 grams (0.0772 mole) of O-2-(4-sec.-butylphenoxy)-ethyl N-methyl phosphoroamidochloridothioate dissolved in 100 milliliters of ethanol. The conditions of reactions and methods of separation were all as previously described with an O-ethyl O-2-(2,4-dichlorophenoxy)-ethyl N-isopropyl phosphoroamidothioate product being obtained as a liquid material having a refractive index n/D of 1.5398 at 25° C. and a chlorine content of 19.12 percent as compared to a theoretical content of 19.05 percent.

*Example 10.—O-ethyl O-2-(4-sec.-butylphenoxy)-ethyl N-methyl phosphoroamidothioate*

Sodium (3.5 grams; 0.152 mole) was dissolved in 100 milliliters of ethanol and the resulting solution added portionwise with stirring to 48.2 grams (0.15 mole) of O-2-(4-sec.-butylphenoxy)-ethyl N-methyl phosphoroamidochloridothioate dispersed in 150 milliliters of ethanol. The conditions of reaction and methods of separation were as previously described with an O-ethyl O-2-(4-sec.-butylphenoxy)-ethyl N-methyl phosphoroamidothioate product being obtained as a liquid material having a refractive index n/D of 1.5238 and a sulfur content of 9.7 percent as compared to a theoretical content of 9.6 percent.

*Example 11.—O-allyl O-2-(3,4-dichlorophenoxy)-ethyl N-isopropyl phosphoroamidothioate*

Sodium (3.5 grams; 0.152 mole) was dissolved in 100 milliliters of allyl alcohol and the resulting solution added portionwise with stirring to 54.2 grams (0.15 mole) of O-2-(3,4-dichlorophenoxy)-ethyl N-isopropyl phosphoroamidochloridothioate in 200 milliliters of allyl alcohol. The reaction conditions and separation methods were those as previously described with an O-allyl O-2-(3,4-dichlorophenoxy)-ethyl N-isopropyl phosphoroamidothioate product being obtained as a liquid material having a refractive index n/D of 1.5461 at 25° C. and a sulfur content of 8.2 percent as compared to a theoretical content of 8.3 percent.

In a similar manner, other phosphoroamidothioates of the present invention may be prepared as follows:

O-amyl O-2-(2,4,6-tribromophenoxy)-ethyl N,N-dimethyl phosphoroamidothioate by reacting O-2-(2,4,6-tribromophenoxy)-ethyl N,N-dimethyl phosphoroamidochlorindothioate with potassium salt of amyl alcohol.

O-methallyl O-2-(2-chloro-4-tertiarybutylphenoxy)-ethyl N-methyl N-ethyl phosphoroamidothioate by reacting O-2-(2-chloro-4-tertiarybutylphenoxy)-ethyl N - methyl phosphoroamidochloridothioate with sodium salt of methallyl alcohol.

O-butyl O-2-(2,4-dimethylphenoxy)-ethyl N,N-dibutyl phosphoroamidothioate by reacting O-2-(2,4-dimethylphenoxy)-ethyl N,N-dibutyl phosphoroamidochloridothioate with potassium butylate.

O-methyl O-2-(pentachlorophenoxy)-ethyl N,N-diethyl phosphoroamidothioate by reacting O-2-(pentachlorophenoxy)-ethyl N,N-diethyl phosphoroamidochloridothioate with potassium methylate.

O-propyl O-2-(2-methyl-4-propylphenoxy)-ethyl N-methyl phosphoroamidothioate by reacting O-2-(2- methyl-4-propylphenoxy) N-methyl phosphoroamidochloridothioate with sodium salt of propanol.

O-methyl O-2-(2,4,6-trimethylphenoxy)-ethyl N,N-dimethyl phosphoroamidothioate by reacting O-2-(2,4,6-trimethylphenoxy)-ethyl N,N-dimethyl phosphoroamidochloridothioate with sodium methylate.

O-isopropyl O-2-(2-chloro-4-bromophenoxy)-ethyl N-methyl phosphoroamidothioate by reacting O-2-(2-chloro-4-bromophenoxy)-ethyl N-methyl phosphoroamidochloridothioate with the sodium salt of isopropanol.

O-methyl O-2-(4-bromo-2-methylphenoxy)-ethyl phosphoroamidothioate by reacting O-2-(4-chloro-2-methylphenoxy)-ethyl phosphoroamidochloridothioate with potassium methylate.

O-2-butenyl O-2-(2,4-dichloro-6-methylphenoxy)-ethyl N-ethyl phosphoroamidothioate by reacting O-2(2,4-dichloro-6-methylphenoxy)-ethyl N-ethyl phosphoroamidochloroidothioate with the sodium salt of 2-butene-1-ol.

The new compounds of the present invention are effective as parasiticides. For such use, the products may be dispersed on an inert finely divided solid and employed as dusts. Also such mixtures may be dispersed in water with the aid of a surface active agent, and the resulting aqueous suspensions employed as sprays. In other procedures, the products may be employed as constituents of oil-in-water emulsions or water dispersions with or without the addition of surface active dispersing agents. In representative operations, 100 percent controls of Mexican bean beetles are obtained with aqueous compositions containing 500 parts by weight of O-ethyl O-2-(3,4-dichlorophenoxy)-ethyl N-methyl phosphoroamidothioate per million parts by weight of ultimate composition.

The O-haloaryl phosphoroamidochloridothioates and O-aryl phosphoroamidochloridothioates employed as starting materials in accordance with the teachings of the present application may be prepared by reacting about two molecular proportions of a suitable amine with one molecular proportion of an O-haloaryl or O-aryl phosphorodichloridothioate at a temperature of from −10° to 50° C. The reaction is somewhat exothermic and takes place smoothly in the described temperature range, with the production of the desired product and amine hydrochloride of reaction. Upon completion of the reaction, the desired phosphoroamidochloridothioate is separated by conventional methods. The O-haloaryl and O-aryl phosphorodichloridothioates may be prepared by reacting an excess of phosphorus thiochloride with a suitable aromatic ether alcohol in the presence of a tertiary amine as hydrogen chloride acceptor. Good results are obtained when operating at temperatures from −10° to 80° C. and employing from 1–5 moles of PSCl₃ with one mole each of tertiary amine and aromatic ether alcohol. Upon completion of the reaction, the desired product may be separated by known methods. The haloaryloxy and aryloxyethanols may be prepared in known methods by reacting a suitable substituted phenol with ethylene oxide in the presence of sodium hydroxide as catalyst. In representative operations, the reactants and catalyst are mixed together and heated under autogenous pressure for about one-half hour at a temperature of from 100° to 170° C. The reaction mixture is then fractionally distilled under reduced pressure to obtain the desired ether alcohol.

I claim:

1. The phosphoroamidothioates corresponding to the formula

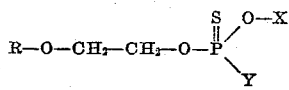

wherein R represents a member of the group consisting of lower alkylphenyl, chlorophenyl and lower alkylchlorophenyl, X represents a member of the group consisting of lower alkyl and lower alkenyl and Y represents lower alkyl amino.

2. O-methyl O-2-(2,4,5-trichlorophenoxy)-ethyl N-methyl phosphoroamidothioate.

3. O - methyl O - 2 - (3,4-dichlorophenoxy)-ethyl N-methyl phosphoroamidothioate.

4. O - methyl O - 2 - (2,4-dichlorophenoxy)-ethyl N-methyl phosphoroamidothioate.

5. O-ethyl O-2-(3,4-dichlorophenoxy)-ethyl N-methyl phosphoroamidothioate.

6. O-ethyl O-2-(2,4-dichlorophenoxy)-ethyl N-methyl phosphoroamidothioate.

No references cited.

UNITED STATES PATENT OFFICE
CERTIFICATE OF CORRECTION

Patent No. 2,971,976                  February 14, 1961

Harry F. Brust

It is hereby certified that error appears in the above numbered patent requiring correction and that the said Letters Patent should read as corrected below.

Column 4, line 16, for "O-2-(4-sec.-butylphenoxy)-ethyl N-methyl phosphoro-" read -- O-2-(2,4-dichlorophenoxy)-N-isopropyl phosphoro- --; line 18, for "reactions" read -- reaction --.

Signed and sealed this 14th day of November 1961.

(SEAL)
Attest:

ERNEST W. SWIDER                          DAVID L. L.
Attesting Officer                            Commissioner of Patents

USCOMM-DC